US009256538B2

(12) United States Patent
Archer et al.

(10) Patent No.: US 9,256,538 B2
(45) Date of Patent: *Feb. 9, 2016

(54) ACQUIRING REMOTE SHARED VARIABLE DIRECTORY INFORMATION IN A PARALLEL COMPUTER

(71) Applicant: INTERNATIONAL BUSINESS MACHINES CORPORATION, Armonk, NY (US)

(72) Inventors: Charles J. Archer, Rochester, MN (US); James E. Carey, Rochester, MN (US); Philip J. Sanders, Rochester, MN (US); Brian E. Smith, Knoxville, TN (US)

(73) Assignee: International Business Machines Corporation, Armonk, NY (US)

( * ) Notice: Subject to any disclaimer, the term of this patent is extended or adjusted under 35 U.S.C. 154(b) by 410 days.

This patent is subject to a terminal disclaimer.

(21) Appl. No.: 13/718,327

(22) Filed: Dec. 18, 2012

(65) Prior Publication Data
US 2014/0173212 A1  Jun. 19, 2014

(51) Int. Cl.
G06F 9/50 (2006.01)
G06F 12/08 (2006.01)
G06F 9/54 (2006.01)
G06F 9/46 (2006.01)

(52) U.S. Cl.
CPC ............ G06F 12/084 (2013.01); G06F 9/5016 (2013.01); G06F 9/544 (2013.01); G06F 12/08 (2013.01)

(58) Field of Classification Search
None
See application file for complete search history.

(56) References Cited

U.S. PATENT DOCUMENTS

| 2005/0149903 | A1 | 7/2005 | Archambault et al. |
| 2005/0198441 | A1 | 9/2005 | Tokoro |
| 2007/0074213 | A1* | 3/2007 | Ma ................... G06F 9/3851 718/100 |
| 2008/0002578 | A1 | 1/2008 | Coffman et al. |
| 2009/0006810 | A1 | 1/2009 | Almasi et al. |
| 2009/0153897 | A1* | 6/2009 | Blackmore et al. ......... 358/1.15 |
| 2009/0240869 | A1 | 9/2009 | O'Krafka et al. |
| 2009/0327444 | A1 | 12/2009 | Archer et al. |
| 2010/0100655 | A1 | 4/2010 | Dowedeit |
| 2011/0219208 | A1 | 9/2011 | Asaad et al. |
| 2011/0289177 | A1 | 11/2011 | Archer et al. |
| 2014/0173201 | A1 | 6/2014 | Archer et al. |

(Continued)

OTHER PUBLICATIONS

Final Office Action U.S. Appl. No. 13/718,276, Apr. 24, 2014.

(Continued)

Primary Examiner — H S Sough
Assistant Examiner — Kimberly Jordan
(74) Attorney, Agent, or Firm — Edward J. Lenart; Grant A. Johnson; Kennedy Lenart Spraggins LLP

(57) ABSTRACT

Methods, parallel computers, and computer program products for acquiring remote shared variable directory (SVD) information in a parallel computer are provided. Embodiments include a runtime optimizer determining that a first thread of a first task requires shared resource data stored in a memory partition corresponding to a second thread of a second task. Embodiments also include the runtime optimizer requesting from the second thread, in response to determining that the first thread of the first task requires the shared resource data, SVD information associated with the shared resource data. Embodiments also include the runtime optimizer receiving from the second thread, the SVD information associated with the shared resource data.

12 Claims, 13 Drawing Sheets

(56) References Cited

U.S. PATENT DOCUMENTS

| | | |
|---|---|---|
| 2014/0173204 A1 | 6/2014 | Archer et al. |
| 2014/0173205 A1 | 6/2014 | Archer et al. |
| 2014/0173257 A1 | 6/2014 | Archer et al. |
| 2014/0173604 A1 | 6/2014 | Archer et al. |
| 2014/0173615 A1 | 6/2014 | Archer et al. |
| 2014/0173626 A1 | 6/2014 | Archer et al. |
| 2014/0173627 A1 | 6/2014 | Archer et al. |
| 2014/0173629 A1 | 6/2014 | Archer et al. |

OTHER PUBLICATIONS

Final Office Action U.S. Appl. No. 13/766,251, Apr. 24, 2014.
Dohashi, "Atomic Operations", mapleprimes.com (online), Nov. 2009, 2 pages, URL: www.mapleprimes.com/maplesoftblog/36246-Atomic-Operations.
Luo et al., "Multi-threaded UPC Runtime with Network Endpoints: Design Alternatives and Evaluation on Multi-core Architectures", 18th International Conference on High Performance Computing (HiPC), Dec. 2011, 10 pages, IEEE Xplore (online), DOI: 10.1109/HiPC.2011.6152734.
Eicken et al. "Active Messages: a Mechanism for Integrated Communication and Computation", Proceedings of the 19th International Symposium on Computer Architecture, May 1992, 20 pages, Gold Coast, Australia, ACM Press.
Willcock et al. "AM++: A Generalized Active Message Framework", Proceedings of the 19th International Conference on Parallel Architectures and Compilation Techniques (PACT'10), Sep. 2010, 10 pages, ACM New York, NY, DOI: 10.1145/1854273.1854323.
Valois, "Lock-Free Linked Lists Using Compare-and-Swap", Proceedings of the Fourteenth Annual ACM Symposium on Principles of Distributed Computing (PODC'95), pp. 214-22, Aug. 1995, ACM New York, NY, DOI: 10.1145/224964.224988.
Barton, C. et al., "Shared Memory Programming for Large Scale Machines", PLDI'06, Jun. 11-14, 2006, Ottawa, Ontario, Canada, pp. 1-10, ACM.
Farreras et al., "Scalable RDMA Performance in PGAS Languages", e-Print, Universitat Politecnica De Catalunya, Mar. 25, 2010, upc.edu (online) [accessed Jun. 13, 2012], 12 pp., URL: http://upcommons.upc.edu/e-prints/bitstream/2117/6804/1/Scalable.pdf.
Barton et al, "An Unified Parallel C Compiler That Implements Automatic Communication Coalescing", In 14th Workshop on Compilers for Parallel Computing (CPC'09), Jan. 2009, upc.edu (online) [accessed Jun. 13, 2012], URL: http://capinfo.e.ac.upc.edu/PDFs/dir28/file003653.pdf.
Barton et al, "A Characterization of Shared Data Access Patterns in UPC Programs", The 19th International Workshop on Languages and Compilers for Parallel Computing (LCPC), Nov. 2006, (online) [accessed Jun. 13, 2012], 16 pp., URL: http://research.ihost.com/lcpc06/final/55/55_Paper.pdf.
Marty, "Cache Coherence Techniques for Multicore Processors", Thesis, Jan. 2008, 27 pages, University of Wisconsin—Madison.

\* cited by examiner

ACQUIRING REMOTE SHARED VARIABLE DIRECTORY INFORMATION IN A PARALLEL COMPUTER

BACKGROUND OF THE INVENTION

1. Field of the Invention

The field of the invention is data processing, or, more specifically, methods, parallel computers, and computer program products for acquiring remote shared variable directory (SVD) information in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same application (split up and specially adapted) on multiple processors in order to obtain results faster. Parallel computing is based on the fact that the process of solving a problem usually can be divided into smaller jobs, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing jobs via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource, the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather.

There is at this time a general trend in computer processor development to move from multi-core to many-core processors: from dual-, tri-, quad-, hexa-, octo-core chips to ones with tens or even hundreds of cores. In addition, multi-core chips mixed with simultaneous multithreading, memory-on-chip, and special-purpose heterogeneous cores promise further performance and efficiency gains, especially in processing multimedia, recognition and networking applications. This trend is impacting the supercomputing world as well, where large transistor count chips are more efficiently used by replicating cores, rather than building chips that are very fast but very inefficient in terms of power utilization.

At the same time, the network link speed and number of links into and out of a compute node are dramatically increasing. IBM's BlueGene/Q™ supercomputer, for example, has a five-dimensional torus network, which implements ten bidirectional data communications links per compute node—and BlueGene/Q supports many thousands of compute nodes. To keep these links filled with data, DMA engines are employed, but increasingly, the HPC community is interested in latency. In traditional supercomputers with pared-down operating systems, there is little or no multi-tasking within compute nodes. When a data communications link is unavailable, a task typically blocks or 'spins' on a data transmission, in effect, idling a processor until a data transmission resource becomes available. In the trend for more powerful individual processors, such blocking or spinning has a bad effect on latency.

SUMMARY OF THE INVENTION

Methods, parallel computers, and computer program products for acquiring remote shared variable directory (SVD) information in a parallel computer are provided. Embodiments include a runtime optimizer determining that a first thread of a first task requires shared resource data stored in a memory partition corresponding to a second thread of a second task. Embodiments also include the runtime optimizer requesting from the second thread, in response to determining that the first thread of the first task requires the shared resource data, SVD information associated with the shared resource data. Embodiments also include the runtime optimizer receiving from the second thread, the SVD information associated with the shared resource data.

DETAILED DESCRIPTION OF EXAMPLE EMBODIMENTS

Figure 1:
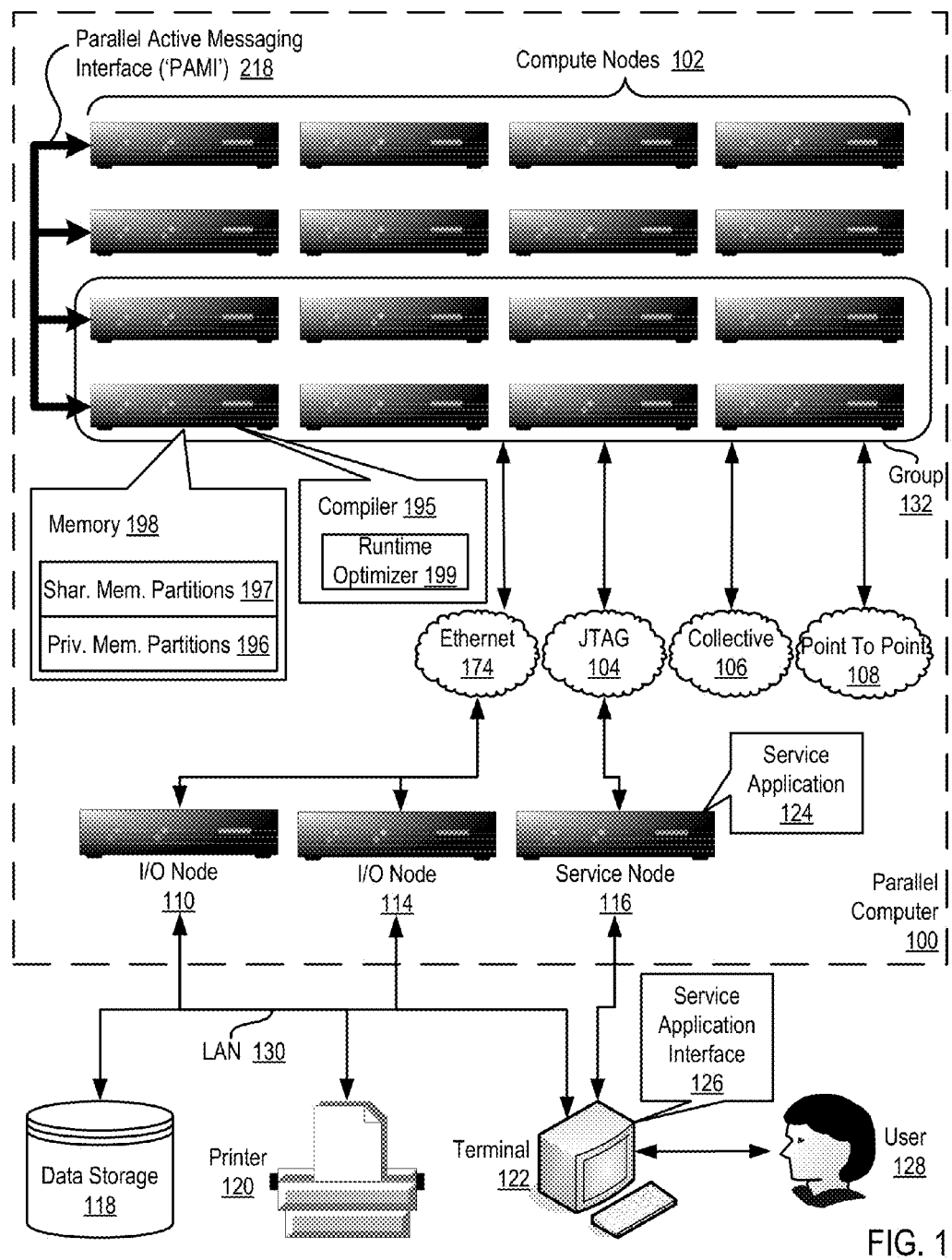
FIG. 1 sets forth a block and network diagram of an example parallel computer that implements acquiring remote SVD information according to embodiments of the present invention.

Example methods, computers, and computer program products for acquiring remote shared variable directory (SVD) information in a parallel computer according to embodiments of the present invention are described with reference to the accompanying drawings, beginning with FIG. 1. FIG. 1 sets forth a block and network diagram of an example parallel computer (100) that implements acquiring remote SVD information according to embodiments of the present invention. The parallel computer (100) in the example of FIG. 1 is coupled to non-volatile memory for the computer in the form of data storage device (118), an output device for the computer in the form of printer (120), and an input/output device for the computer in the form of computer terminal (122). The parallel computer (100) in the example of FIG. 1 includes a plurality of compute nodes (102).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a tree network (106) which is optimized for collective operations, and a torus network (108) which is optimized point to point operations. Tree network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operations for moving data among compute nodes of an operational group. A 'reduce' operation is an example of a collective operation that executes arithmetic or logical functions on data distributed among the compute nodes of an operational group. An operational group may be implemented as, for example, an MPI 'communicator,' or a partitioned global address space (PGAS) 'communicator.'

In the example of FIG. 1, each compute node includes memory and a compiler. For illustrative purposes, an example memory (198) and an example compiler (195) are shown. According to embodiments of the present invention, the memory (198) is configured according to a PGAS programming model. The compiler (195) of FIG. 1 includes a PGAS runtime optimizer (199) to aid in the execution of PGAS programming code of the compiler.

In PGAS programming models like Unified Parallel C (UPC), the programming model is different than traditional distributed programming models. In a PGAS model, a thread may have both private memory as well as shared memory across the address space. That is, the memory is partitioned to provide thread local memory to a thread as well as shared memory across the threads.

In PGAS style languages and programming models, the address space is global across the threads of a job. Even though the address spaces used to construct a particular job may span multiple OSI's and are protected by hardware, UPC allows access to these address spaces implicitly through language constructs such as the keyword 'shared.' This keyword allows the user to construct a variable in a line of code that allows access across a number of threads, for example the following UPC code may be used to perform vector addition:

```
#include <upc_relaxed.h>
#define N 100*THREADS
shared int v1[N], v2[N], v1plusv2[N];
void main( ) {
int i;
for(i=MYTHREAD; i<N; i+=THREADS)
v1plusv2[i]=v1[i]+v2[i];
}
```

In this example, variable are parallelized across one hundred threads. As explained above, no explicit calls are used to implement parallelism. Instead, the keyword 'shared' is used to indicate the variable is parallelized across threads. That is, no knowledge of the layout of the threads to the hardware is required for generating UPC code.

With PGAS programming models, the user writes code in a similar fashion to serial code (like C) and hints to a compiler when certain variables or code segments can be parallelized, including the creation of shared objects. For example, in the Unified Parallel C (UPC) PGAS programming model, shared objects (i.e., data structures accessible from all UPC threads) form the basis of the UPC language. Examples of shared objects include but are not limited to: shared scalers (including structures/unions/enumerations), shared arrays (including multi-blocked array), shared pointers (with either shared or private targets), and shared locks.

Central to the PGAS programming models is the concept of shared object affinity. A shared object is affine to a particular thread if it is local to that thread's memory. For example, in UPC, shared arrays may be distributed among a plurality of threads so different pieces of the array may have affinity to different threads. A compiler may utilize a runtime optimizer to help map and control resources of the threads.

A PGAS runtime optimizer is generally a module of computer program instructions configured to identify, create, and allocate resources for a particular job. For example, a PGAS runtime optimizer may be configured to spawn and collect UPC threads, implement access to shared data, perform pointer arithmetic on pointers to shared objects and implement all the UPC intrinsic function calls (such as upc_phaseof, upc_barrier and upc_memget). A PGAS runtime optimizer may also be generally configured to map the resources in an optimal way to available hardware and begin execution of core code on the resources.

To help organize and control access to these shared resources, a PGAS runtime optimizer may implement a Shared Variable Directory (SVD) that is used to store locations of variables that are shared across the tasks. A PGAS runtime optimizer may use an SVD to look up and find resources within a UPC job. This may include looking up memory, thread, and other resource locations.

An SVD may be a table contained on each task of a node and is used to look up remote resources of other tasks. In a particular embodiment, an SVD may include a partition for each thread where each partition of the SVD holds a list of those variable affine to a particular thread. The SVD may also include another partition that is reserved for shared variables allocated statically or through collective operations. Shared objects may be referred to by an SVD handle, which is an opaque object that is internally indexed in the SVD. An SVD handle may contain the partition number in the directory, and the index of the object in the partition.

Multiple replicas of an SVD may exist in a system and the SVD often changes at runtime because of UPC routines for dynamic data allocation. Because in the PGAS programming models, each thread may allocate and de-allocate shared variables independently of each other, changes to copies of the SVD may require threads to communicate updates to each other by acquiring remote SVD information from other tasks.

In the example of FIG. 1, the runtime optimizer (199) may include computer program instructions for acquiring remote SVD information according to embodiments of the present invention. Specifically, the runtime optimizer (199) may include computer program instructions that when executed by a computer processor cause the computer processor to function by partitioning memory (198) such that each thread is provided a partition of shared memory (197) and a partition of private memory (196). As explained above, the runtime optimizer (199) may also be configured to map resources across the partitions and to create an SVD to index these mappings. The runtime optimizer (199) may also be configured to determine that a first thread of a first task requires shared resource data stored in a shared memory partition corresponding to a second thread of a second task. The runtime optimizer (199) may also be configured to request from the second thread, in response to determining that the first thread of the first task requires the shared resource data, the shared resource data and SVD information associated with the shared resource data. The runtime optimizer (199) may include computer program instructions that when executed by a computer processor cause the computer processor to function by receiving from the second thread, the shared resource data and the SVD information.

To transfer information and data between the tasks, the PGAS runtime optimizer (199) may access a lower level message passing layer, such as a Parallel Active Message Interface (PAMI) (218) that implements primitives across the tasks in the job, including collective operations.

Most collective operations are variations or combinations of four basic operations: broadcast, gather, scatter, and reduce. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. All processes specify the same receive count. The send arguments are only significant to the root process, whose buffer actually contains sendcount*N elements of a given datatype, where N is the number of processes in the given group of compute nodes. The send buffer will be divided equally and dispersed to all processes (including itself). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations.

In addition to compute nodes, the example parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications to I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As the term is used here, a parallel active messaging interface or 'PAMI' (218) is a system-level messaging layer in a protocol stack of a parallel computer that is composed of data communications endpoints each of which is specified with data communications parameters for a thread of execution on a compute node of the parallel computer. The PAMI is a 'parallel' interface in that many instances of the PAMI operate in parallel on the compute nodes of a parallel computer. The PAMI is an 'active messaging interface' in that data communications messages in the PAMI are active messages, 'active' in the sense that such messages implement callback functions to advise of message dispatch and instruction completion and so on, thereby reducing the quantity of acknowledgment traffic, and the like, burdening the data communication resources of the PAMI.

Each data communications endpoint of a PAMI is implemented as a combination of a client, a context, and a task. A 'client' as the term is used in PAMI operations is a collection of data communications resources dedicated to the exclusive use of an application-level data processing entity, an application or an application messaging module such as an MPI library. A 'context' as the term is used in PAMI operations is composed of a subset of a client's collection of data processing resources, context functions, and a work queue of data transfer instructions to be performed by use of the subset through the context functions operated by an assigned thread of execution. In at least some embodiments, the context's subset of a client's data processing resources is dedicated to the exclusive use of the context. A 'task' as the term is used in PAMI operations refers to a canonical entity, an integer or objection oriented programming object, that represents in a PAMI a process of execution of the parallel application. That is, a task is typically implemented as an identifier of a particular instance of an application executing on a compute node, a compute core on a compute node, or a thread of execution on a multi-threading compute core on a compute node.

In the example of FIG. 1, the compute nodes (102), as well as PAMI endpoints on the compute nodes, are coupled for data communications through the PAMI (218) and through data communications resources such as collective network (106) and point-to-point network (108). In any particular communication of data, an origin endpoint and a target endpoint can be any two endpoints on any of the compute nodes (102), on different compute nodes, or two endpoints on the same compute node. Collective operations can have one origin endpoint and many target endpoints, as in a BROADCAST, for example, or many origin endpoints and one target endpoint, as in a GATHER, for example. A sequence of data communications instructions, including instructions for collective operations, resides in a work queue of a context and results in data transfers among endpoints, origin endpoints and target endpoints. Data communications instructions, including instructions for collective operations, are 'active' in the sense that the instructions implement callback functions to advise of and implement instruction dispatch and instruction completion, thereby reducing the quantity of acknowledgment traffic required on the network. Each such data communications instruction or instruction for a collective operation effects a data transfer or transfers, from one or more origin endpoints to one or more target endpoints, through some form of data communications resources, networks, shared memory segments, network adapters, DMA controllers, and the like.

The arrangement of compute nodes, networks, and I/O devices making up the example parallel computer illustrated in FIG. 1 are for explanation only, not for limitation of the present invention. Parallel computers capable of data communications in a PAMI according to embodiments of the present invention may include additional nodes, networks, devices, and architectures, not shown in FIG. 1, as will occur to those of skill in the art. The parallel computer (100) in the example of FIG. 1 includes sixteen compute nodes (102); some parallel computers that implement acquiring remote shared variable directory (SVD) information according to some embodiments of the present invention include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Acquiring remote shared variable directory (SVD) information according to embodiments of the present invention is generally implemented on a parallel computer that includes a plurality of compute nodes. In fact, such computers may include thousands of such compute nodes, with a compute node typically executing at least one instance of a parallel application. Each compute node is in turn itself a computer composed of one or more computer processors, its own computer memory, and its own input/output ('I/O') adapters. For further explanation, therefore, FIG. 2 sets forth a block diagram of an example compute node (152) for use in a parallel computer that implement acquiring remote shared variable directory (SVD) information according to embodiments of the present invention. The compute node (152) of FIG. 2 includes one or more computer processors (164) as well as random access memory ('RAM') (156). Each processor (164) can support multiple hardware compute cores (165), and each such core can in turn support multiple threads of execution, hardware threads of execution as well as software threads. Each processor (164) is connected to RAM (156) through a high-speed front side bus (161), bus adapter (194), and a high-speed memory bus (154)—and through bus adapter (194) and an extension bus (168) to other components of the compute node. Stored in RAM (156) is an application program (158), a module of computer program instructions that carries out parallel, user-level data processing using parallel algorithms.

Also stored RAM (156) is an runtime optimizer (216), a library of computer program instructions that carry out application-level parallel communications among compute nodes, including point to point operations as well as collective operations. Although the application program can call PAMI routines directly, the application program (158) often executes point-to-point data communications operations by calling software routines in the application messaging module (215), which in turn is improved according to embodiments of the present invention to use PAMI functions to implement such communications. An application messaging module can be developed from scratch to use a PAMI according to embodiments of the present invention, using a traditional programming language such as the C programming language or C++, for example, and using traditional programming methods to write parallel communications routines that send and receive data among PAMI endpoints and compute nodes through data communications networks or shared-memory transfers.

Figure 2:
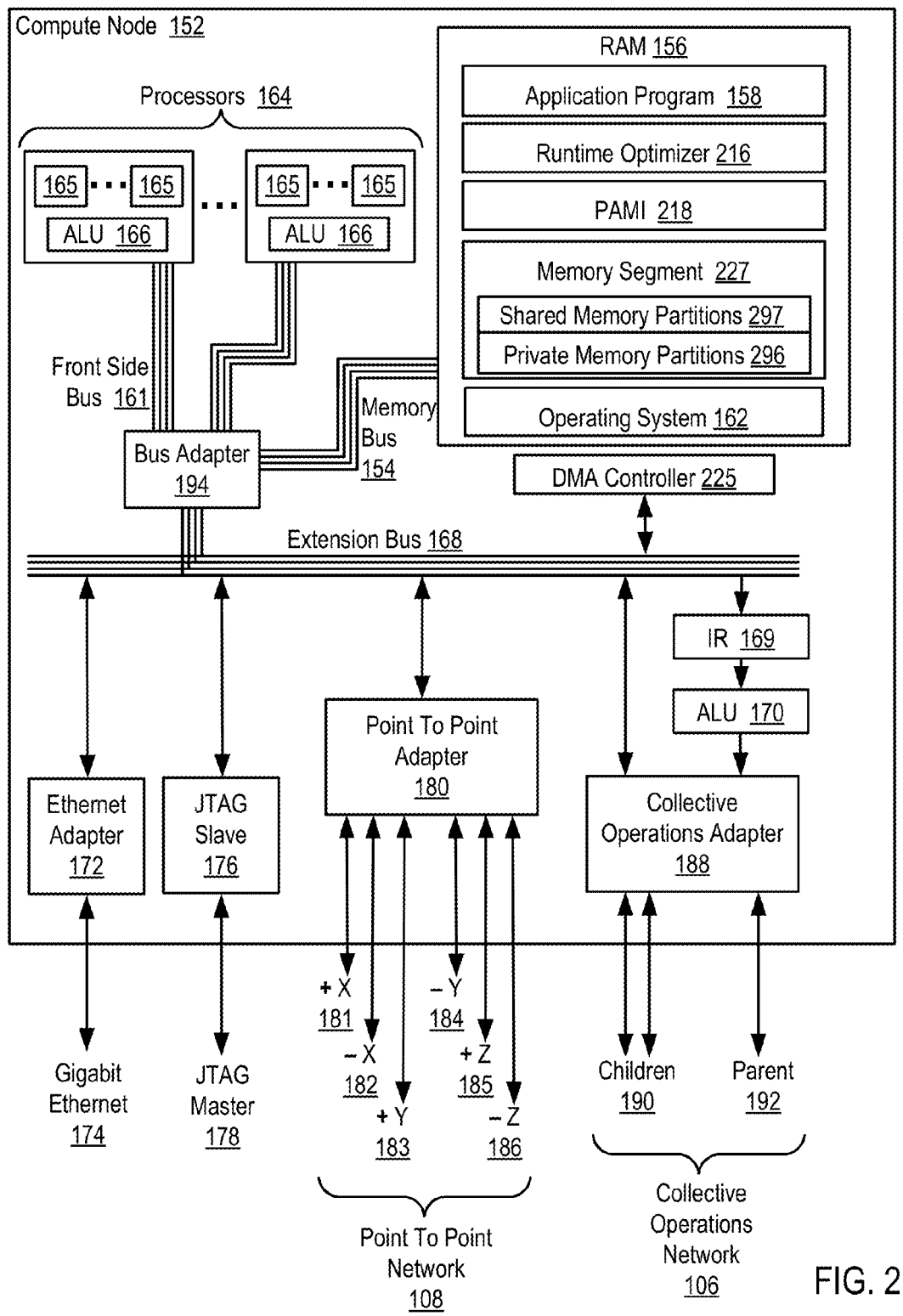
FIG. 2 sets forth a block diagram of an example compute node for use in parallel computers that implement acquiring remote SVD information according to embodiments of the present invention.

Also represented in RAM in the example of FIG. 2 is a PAMI (218). Readers will recognize, however, that the representation of the PAMI in RAM is a convention for ease of explanation rather than a limitation of the present invention, because the PAMI and its components, endpoints, clients, contexts, and so on, have particular associations with and inclusions of hardware data communications resources. In fact, the PAMI can be implemented partly as software or firmware and hardware—or even, at least in some embodiments, entirely in hardware.

Also represented in RAM (156) in the example of FIG. 2 is a segment (227) of memory. According to embodiments of the present invention, the runtime optimizer (216) may be configured to partition the memory (227) such that each thread is provided a partition of shared memory (297) and a partition of private memory (296). As explained above, the runtime optimizer (216) may also be configured to map resources across the partitions and to create an SVD to index these mappings. The runtime optimizer (216) may also be configured to determine that a first thread of a first task requires shared resource data stored in a shared memory partition corresponding to a second thread of a second task. The runtime optimizer (216) may also be configured to request from the second thread, in response to determining that the first thread of the first task requires the shared resource data, the shared resource data and SVD information associated with the shared resource data. The runtime optimizer (216) may include computer program instructions that when executed by a computer processor cause the computer processor to function by receiving from the second thread, the shared resource data and the SVD information.

In the example of FIG. 2, each processor or compute core has uniform access to the RAM (156) on the compute node, so that accessing a segment of shared memory is equally fast regardless where the shared segment is located in physical memory. In some embodiments, however, modules of physical memory are dedicated to particular processors, so that a processor may access local memory quickly and remote memory more slowly, a configuration referred to as a Non-Uniform Memory Access or 'NUMA.' In such embodiments, a segment of shared memory can be configured locally for one endpoint and remotely for another endpoint—or remotely from both endpoints of a communication. From the perspective of an origin endpoint transmitting data through a segment of shared memory that is configured remotely with respect to the origin endpoint, transmitting data through the segment of shared memory will appear slower that if the segment of shared memory were configured locally with respect to the origin endpoint—or if the segment were local to both the origin endpoint and the target endpoint. This is the effect of the architecture represented by the compute node (152) in the example of FIG. 2 with all processors and all compute cores coupled through the same bus to the RAM—that all accesses to segments of memory shared among processes or processors on the compute node are local—and therefore very fast.

Also stored in RAM (156) in the example compute node of FIG. 2 is an operating system (162), a module of computer program instructions and routines for an application program's access to other resources of the compute node. It is possible, in some embodiments at least, for an application program, an application messaging module, and a PAMI in a compute node of a parallel computer to run threads of execution with no user login and no security issues because each such thread is entitled to complete access to all resources of the node. The quantity and complexity of duties to be performed by an operating system on a compute node in a parallel computer therefore can be somewhat smaller and less complex than those of an operating system on a serial computer with many threads running simultaneously with various level of authorization for access to resources. In addition, there is no video I/O on the compute node (152) of FIG. 2, another factor that decreases the demands on the operating system. The operating system may therefore be quite lightweight by comparison with operating systems of general purpose computers, a pared down or 'lightweight' version as it were, or an operating system developed specifically for operations on a particular parallel computer. Operating systems that may be improved or simplified for use in a compute node according to embodiments of the present invention include UNIX™, Linux™, Microsoft XP™, AIX™, IBM's i5/OS™, and others as will occur to those of skill in the art.

The example compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters for use in computers that implement acquiring remote shared variable directory (SVD) information according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit).

Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also used as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in data communications in a PAMI according to embodiments of the present invention.

The data communications adapters in the example of FIG. 2 includes a Point To Point Adapter (180) that couples example compute node (152) for data communications to a data communications network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186). For ease of explanation, the Point To Point Adapter (180) of FIG. 2 as illustrated is configured for data communications in three dimensions, x, y, and z, but readers will recognize that Point To Point Adapters optimized for point-to-point operations in data communications in a PAMI of a parallel computer according to embodiments of the present invention may in fact be implemented so as to support communications in two dimensions, four dimensions, five dimensions, and so on.

The data communications adapters in the example of FIG. 2 includes a Collective Operations Adapter (188) that couples example compute node (152) for data communications to a network (106) that is optimal for collective message passing operations such as, for example, a network configured as a binary tree. Collective Operations Adapter (188) provides data communications through three bidirectional links: two to children nodes (190) and one to a parent node (192).

The example compute node (152) includes a number of arithmetic logic units ('ALUs'). ALUs (166) are components of processors (164), and a separate ALU (170) is dedicated to the exclusive use of collective operations adapter (188) for use in performing the arithmetic and logical functions of reduction operations. Computer program instructions of a reduction routine in an application messaging module (215) or a PAMI (218) may latch an instruction for an arithmetic or logical function into instruction register (169). When the arithmetic or logical function of a reduction operation is a 'sum' or a 'logical OR,' for example, collective operations adapter (188) may execute the arithmetic or logical operation by use of an ALU (166) in a processor (164) or, typically much faster, by use of the dedicated ALU (170).

The example compute node (152) of FIG. 2 includes a direct memory access ('DMA') controller (225), a module of automated computing machinery that implements, through communications with other DMA engines on other compute nodes, or on a same compute node, direct memory access to and from memory on its own compute node as well as memory on other compute nodes. Direct memory access is a way of reading and writing to and from memory of compute nodes with reduced operational burden on computer processors (164); a CPU initiates a DMA transfer, but the CPU does not execute the DMA transfer. A DMA transfer essentially copies a block of memory from one compute node to another, or between RAM segments of applications on the same compute node, from an origin to a target for a PUT operation, from a target to an origin for a GET operation.

Figure 3A:
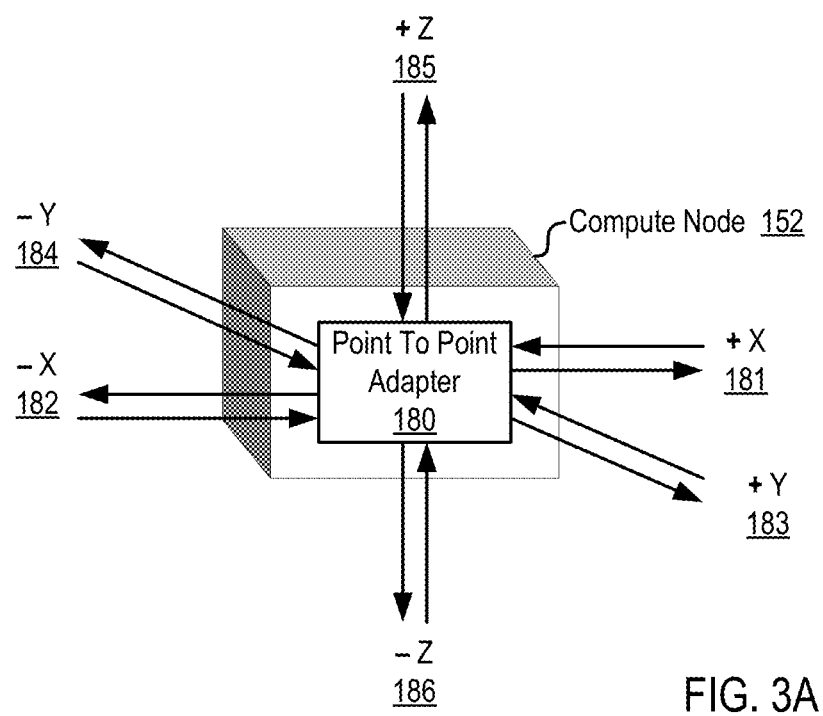
FIG. 3A illustrates an example Point To Point Adapter for use in parallel computers that implement acquiring remote SVD information according to embodiments of the present invention.

For further explanation, FIG. 3A illustrates an example of a Point To Point Adapter (180) useful in parallel computers that implement acquiring remote shared variable directory (SVD) information according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185). For ease of explanation, the Point To Point Adapter (180) of FIG. 3A as illustrated is configured for data communications in only three dimensions, x, y, and z, but readers will recognize that Point To Point Adapters optimized for point-to-point operations in a parallel computer that implements acquiring remote shared variable directory (SVD) information according to embodiments of the present invention may in fact be implemented so as to support communications in two dimensions, four dimensions, five dimensions, and so on. Several supercomputers now use five dimensional mesh or torus networks, including, for example, IBM's Blue Gene Q™.

Figure 3B:
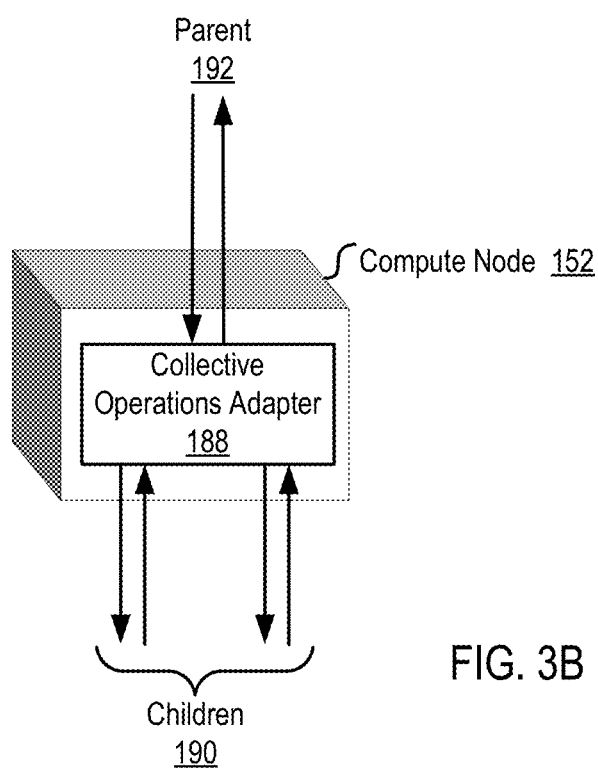
FIG. 3B illustrates an example Collective Operations Adapter for use in parallel computers that implement acquiring remote SVD information according to embodiments of the present invention.

For further explanation, FIG. 3B illustrates an example of a Collective Operations Adapter (188) useful in a parallel computer that implements acquiring remote shared variable directory (SVD) information according to embodiments of the present invention. Collective Operations Adapter (188) is designed for use in a network optimized for collective operations, a network that organizes compute nodes of a parallel computer in a binary tree. Collective Operations Adapter (188) in the example of FIG. 3B provides data communication to and from two children nodes through four unidirectional data communications links (190). Collective Operations Adapter (188) also provides data communication to and from a parent node through two unidirectional data communications links (192).

Figure 4:
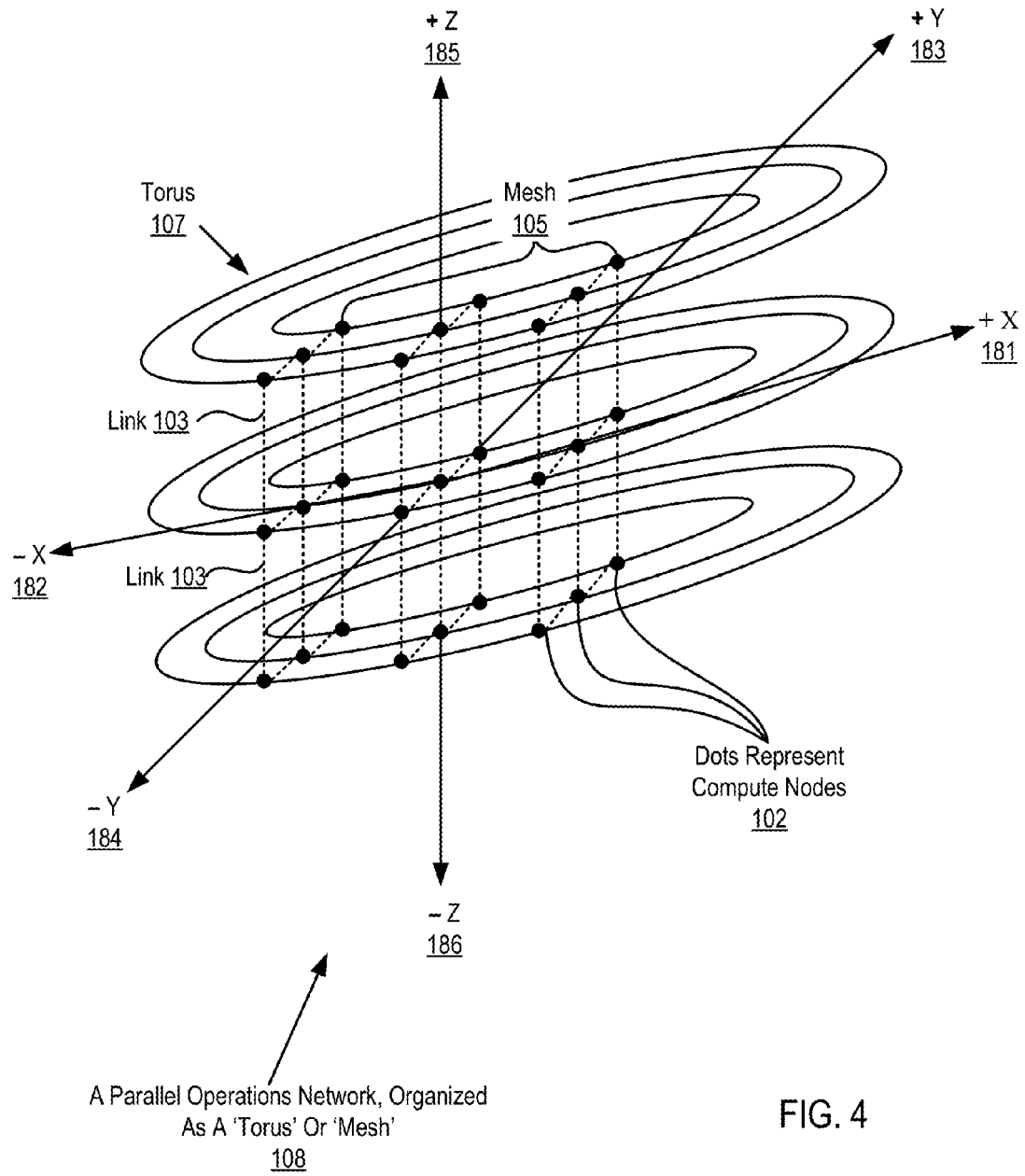
FIG. 4 illustrates an example data communications network optimized for point to point operations for use in parallel computers that implement acquiring remote SVD information according to embodiments of the present invention.

For further explanation, FIG. 4 sets forth a line drawing illustrating an example data communications network (108) optimized for point-to-point operations useful in parallel computers that implement acquiring remote shared variable directory (SVD) information according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations in a parallel computer that implements acquiring remote shared variable directory (SVD) information according to embodiments of the present invention may contain only a few compute nodes or may contain thousands of compute nodes. For ease of explanation, the data communications network of FIG. 4 is illustrated with only three dimensions: x, y, and z, but readers will recognize that a data communications network optimized for point-to-point operations may in fact be implemented in two dimensions, four dimensions, five dimensions, and so on. As mentioned, several supercomputers now use five dimensional mesh or torus networks, including IBM's Blue Gene Q™.

Figure 5:
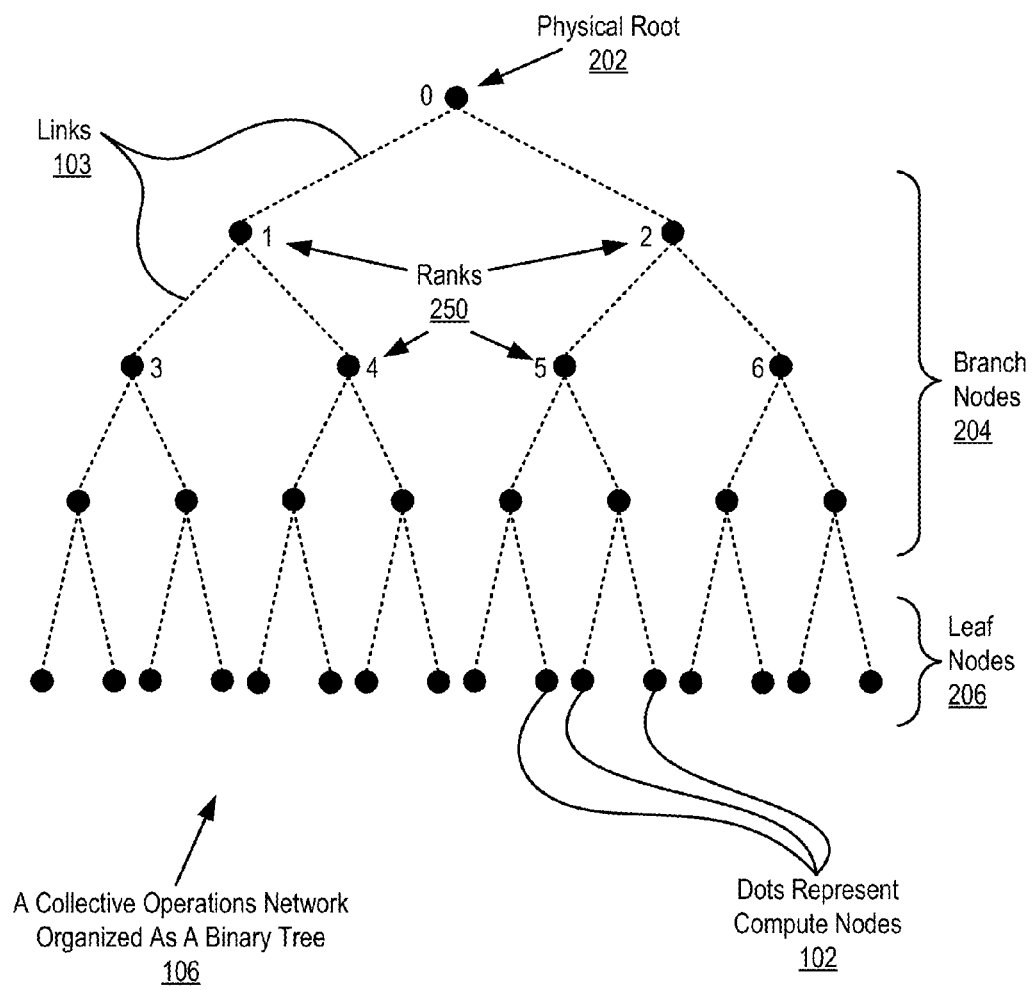
FIG. 5 illustrates an example data communications network optimized for collective operations by organizing compute nodes in a tree for use in parallel computers that implement acquiring remote SVD information according to embodiments of the present invention.

For further explanation, FIG. 5 illustrates an example data communications network (106) optimized for collective operations by organizing compute nodes in a tree. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with collective operations data communications adapters similar to the one illustrated for example in FIG. 3B, with each node typically providing data communications to and from two children nodes and data communications to and from a parent node, with some exceptions. Nodes in a binary tree may be characterized as a root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in parallel computers that implement acquiring remote shared variable directory (SVD) information according to embodiments of the present invention may contain only a few compute nodes or hundreds or thousands of compute nodes.

In the example of FIG. 5, each node in the tree is assigned a unit identifier referred to as a 'rank' (250). The rank actually identifies an instance of a parallel application that is executing on a compute node. That is, the rank is an application-level identifier. Using the rank to identify a node assumes that only one such instance of an application is executing on each node. A compute node can, however, support multiple processors, each of which can support multiple processing cores—so that more than one process or instance of an application can easily be present under execution on any given compute node—or in all the compute nodes, for that matter. To the extent that more than one instance of an application executes on a single compute node, the rank identifies the instance of the application as such rather than the compute node. A rank uniquely identifies an application's location in the tree network for use in both point-to-point and collective operations in the tree network. The ranks in this example are assigned as integers beginning with '0' assigned to the root instance or root node (202), '1' assigned to the first node in the second layer of the tree, '2' assigned to the second node in the second layer of the tree, '3' assigned to the first node in the third layer of the tree, '4' assigned to the second node in the third layer of the tree, and so on. For ease of illustration, only the ranks of the first three layers of the tree are shown here, but all compute nodes, or rather all application instances, in the tree network are assigned a unique rank. Such rank values can also be assigned as identifiers of application instances as organized in a mesh or torus network.

Figure 6:
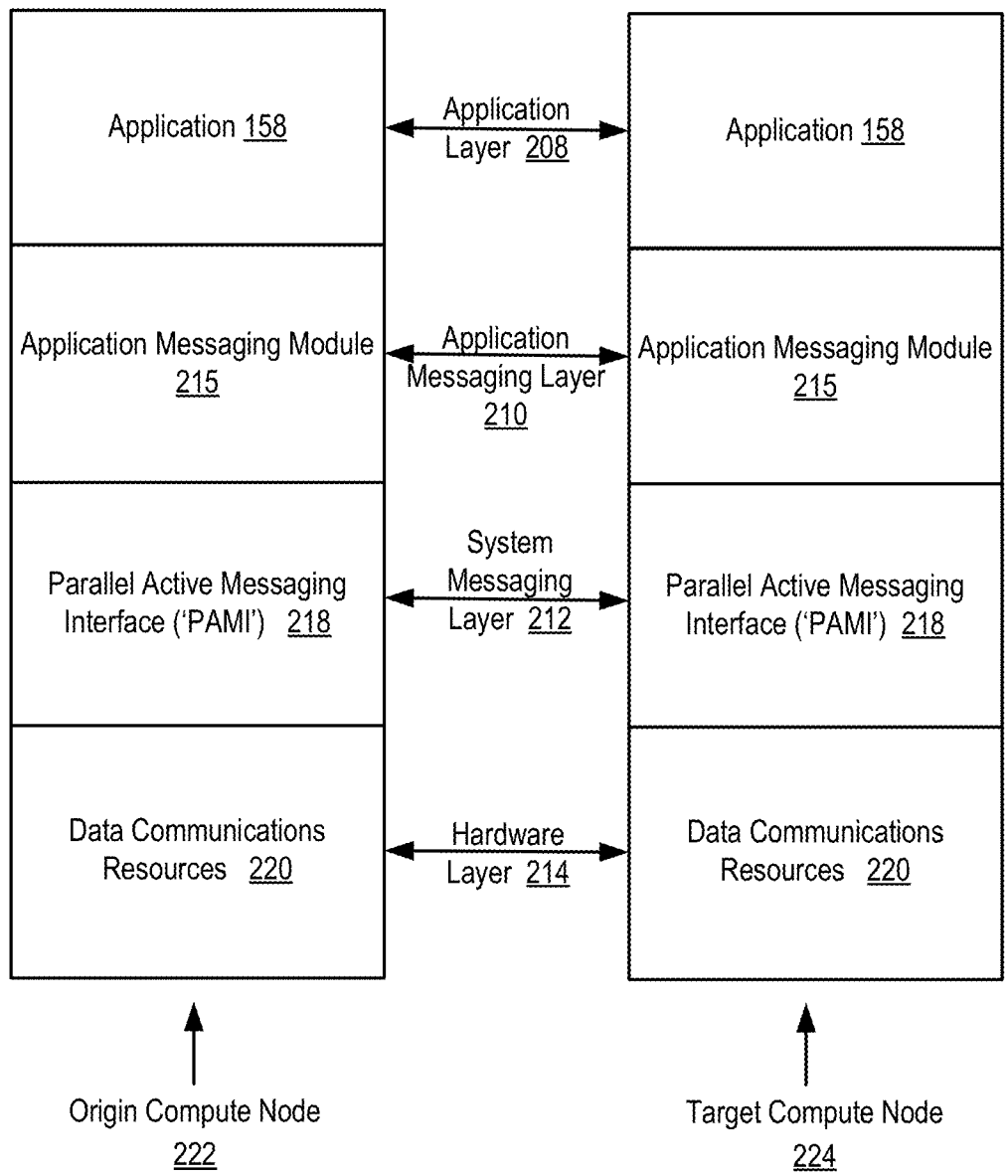
FIG. 6 sets forth a block diagram of an example protocol stack for use in parallel computers that implement acquiring remote SVD information according to embodiments of the present invention.

For further explanation, FIG. 6 sets forth a block diagram of an example protocol stack useful in parallel computers that implement acquiring remote shared variable directory (SVD) information according to embodiments of the present invention. The example protocol stack of FIG. 6 includes a hardware layer (214), a system messaging layer (212), an application messaging layer (210), and an application layer (208). For ease of explanation, the protocol layers in the example stack of FIG. 6 are shown connecting an origin compute node (222) and a target compute node (224), although it is worthwhile to point out that in embodiments that effect DMA data transfers, the origin compute node and the target compute node can be the same compute node. The granularity of connection through the system messaging layer (212), which is implemented with a PAMI (218), is finer than merely compute node to compute node—because, again, communications among endpoints often is communications among endpoints on the same compute node. For further explanation, recall that the PAMI (218) connects endpoints, connections specified by combinations of clients, contexts, and tasks, each such combination being specific to a thread of execution on a compute node, with each compute node capable of supporting many threads and therefore many endpoints. Every endpoint typically can function as both an origin endpoint or a target endpoint for data transfers through a PAMI, and both the origin endpoint and its target endpoint can be located on the same compute node. So an origin compute node (222) and its target compute node (224) can in fact, and often will, be the same compute node.

The application layer (208) provides communications among instances of a parallel application (158) running on the compute nodes (222, 224) by invoking functions in an application messaging module (215) installed on each compute node. Communications among instances of the application through messages passed between the instances of the application. Applications may communicate messages invoking function of an application programming interface ('API') exposed by the application messaging module (215). In this approach, the application messaging module (215) exposes a traditional interface, such as an API of an MPI library, to the application program (158) so that the application program can gain the benefits of a PAMI, reduced network traffic, callback functions, and so on, with no need to recode the application. Alternatively, if the parallel application is programmed to use PAMI functions, the application can call the PAMI functions directly, without going through the application messaging module.

The example protocol stack of FIG. 6 includes a system messaging layer (212) implemented here as a PAMI (218). The PAMI provides system-level data communications functions that support messaging in the application layer (602) and the application messaging layer (610). Such system-level functions are typically invoked through an API exposed to the application messaging modules (215) in the application messaging layer (210). Although developers can in fact access a PAMI API directly by coding an application to do so, a PAMI's system-level functions in the system messaging layer (212) in many embodiments are isolated from the application layer (208) by the application messaging layer (210), making the application layer somewhat independent of system specific details. With an application messaging module presenting a standard MPI API to an application, for example, with the application messaging module retooled to use the PAMI to carry out the low-level messaging functions, the application gains the benefits of a PAMI with no need to incur the expense of reprogramming the application to call the PAMI directly. Because, however, some applications will in fact be reprogrammed to call the PAMI directly, all entities in the protocol stack above the PAMI are viewed by PAMI as applications. When PAMI functions are invoked by entities above the PAMI in the stack, the PAMI makes no distinction whether the caller is in the application layer or the application messaging layer, no distinction whether the caller is an application as such or an MPI library function invoked by an application. As far as the PAMI is concerned, any caller of a PAMI function is an application.

The protocol stack of FIG. 6 includes a hardware layer (634) that defines the physical implementation and the electrical implementation of aspects of the hardware on the compute nodes such as the bus, network cabling, connector types, physical data rates, data transmission encoding and many other factors for communications between the compute nodes (222) on the physical network medium. In parallel computers that implement acquiring remote shared variable directory (SVD) information with DMA controllers according to embodiments of the present invention, the hardware layer includes DMA controllers and network links, including routers, packet switches, and the like.

Figure 7:
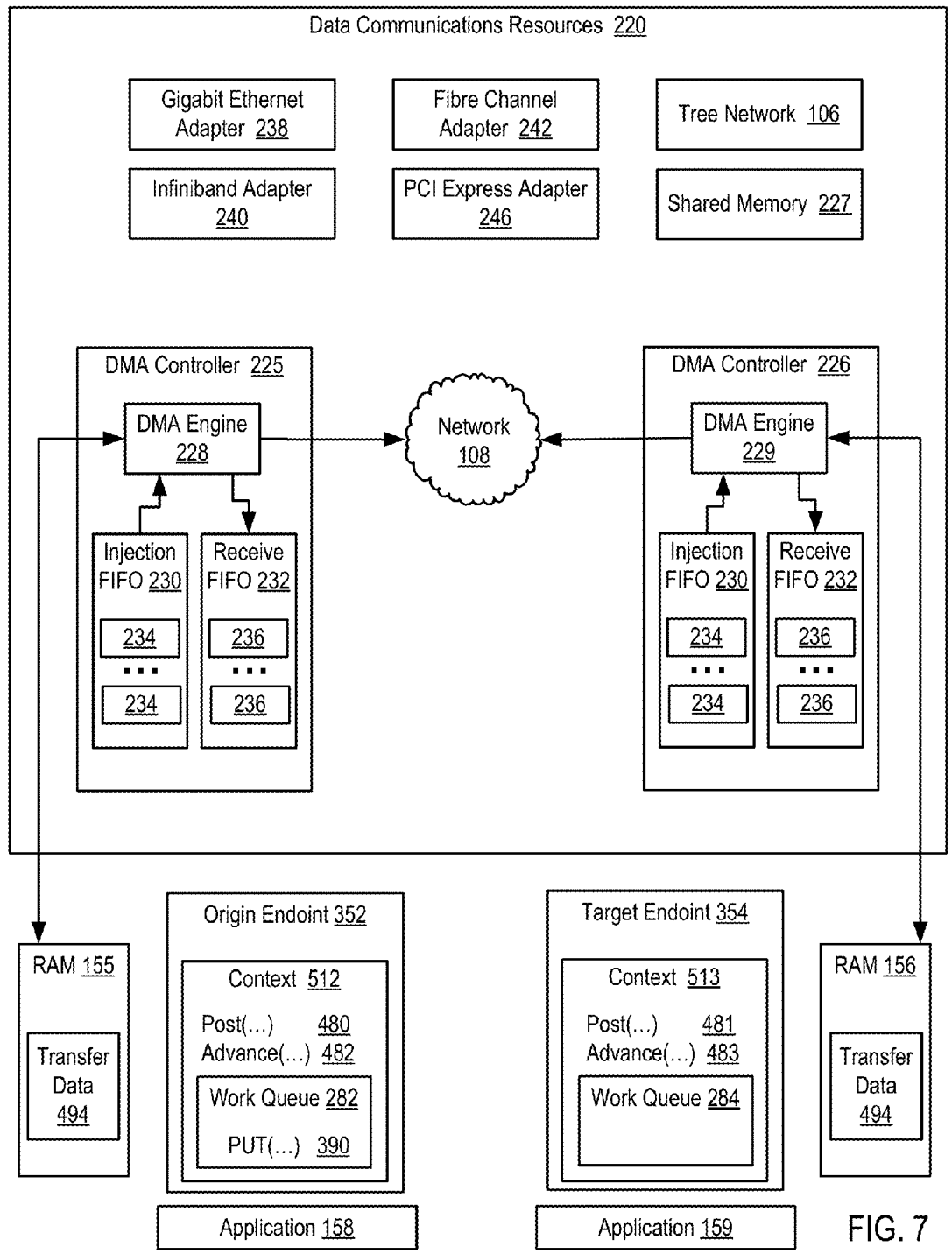
FIG. 7 sets forth a functional block diagram of example data communications resources for use in parallel computers that implement acquiring remote SVD information according to embodiments of the present invention.

For further explanation of data communications resources assigned in collections to PAMI clients, FIG. 7 sets forth a block diagram of example data communications resources (220) useful in parallel computers that implement acquiring remote shared variable directory (SVD) information according to embodiments of the present invention. The data communications resources of FIG. 7 include a gigabit Ethernet adapter (238), an Infiniband adapter (240), a Fibre Channel adapter (242), a PCI Express adapter (246), a collective operations network configured as a tree (106), shared memory (227), DMA controllers (225, 226), and a network (108) configured as a point-to-point torus or mesh like the network described above with reference to FIG. 4. A PAMI is configured with clients, each of which is in turn configured with certain collections of such data communications resources—so that, for example, the PAMI client (302) in the PAMI (218) in the example of FIG. 7 can have dedicated to its use a collection of data communications resources composed of six segments (227) of shared memory, six Gigabit Ethernet adapters (238), and six Infiniband adapters (240). And the PAMI client (304) can have dedicated to its use six Fibre Channel adapters (242), a DMA controller (225), a torus network (108), and five segments (227) of shared memory. And so on.

The DMA controllers (225, 226) in the example of FIG. 7 each is configured with DMA control logic in the form of a DMA engine (228, 229), an injection FIFO buffer (230), and a receive FIFO buffer (232). The DMA engines (228, 229) can be implemented as hardware components, logic networks of a DMA controller, in firmware, as software operating an embedded controller, as various combinations of software, firmware, or hardware, and so on. Each DMA engine (228, 229) operates on behalf of endpoints to send and receive DMA transfer data through the network (108). The DMA engines (228, 229) operate the injection buffers (230, 232) by processing first-in-first-out descriptors (234, 236) in the buffers, hence the designation 'injection FIFO' and 'receive FIFO.'

For further explanation, here is an example use case, a description of the overall operation of an example PUT DMA transfer using the DMA controllers (225, 226) and network (108) in the example of FIG. 7: An originating application (158), which is typically one instance of a parallel application running on a compute node, places a quantity of transfer data (494) at a location in its RAM (155). The application (158) then calls a post function (480) on a context (512) of an origin endpoint (352), posting a PUT instruction (390) into a work queue (282) of the context (512); the PUT instruction (390) specifies a target endpoint (354) to which the transfer data is to be sent as well as source and destination memory locations. The application then calls an advance function (482) on the context (512). The advance function (482) finds the new PUT instruction in its work queue (282) and inserts a data descriptor (234) into the injection FIFO of the origin DMA controller (225); the data descriptor includes the source and destination memory locations and the specification of the target endpoint. The origin DMA engine (225) then transfers the data descriptor (234) as well as the transfer data (494) through the network (108) to the DMA controller (226) on the target side of the transaction. The target DMA engine (229), upon receiving the data descriptor and the transfer data, places the transfer data (494) into the RAM (156) of the target application at the location specified in the data descriptor and inserts into the target DMA controller's receive FIFO (232) a data descriptor (236) that specifies the target endpoint and the location of the transfer data (494) in RAM (156). The target application (159) or application instance calls an advance function (483) on a context (513) of the target endpoint (354). The advance function (483) checks the communications resources assigned to its context (513) for incoming messages, including checking the receive FIFO (232) of the target DMA controller (226) for data descriptors that specify the target endpoint (354). The advance function (483) finds the data descriptor for the PUT transfer and advises the target application (159) that its transfer data has arrived. A GET-type DMA transfer works in a similar manner, with some differences, including, of course, the fact that transfer data flows in the opposite direction. Similarly, typical SEND transfers also operate similarly, some with rendezvous protocols, some with eager protocols, with data transmitted in packets over the a network through non-DMA network adapters or through DMA controllers.

Figure 8:
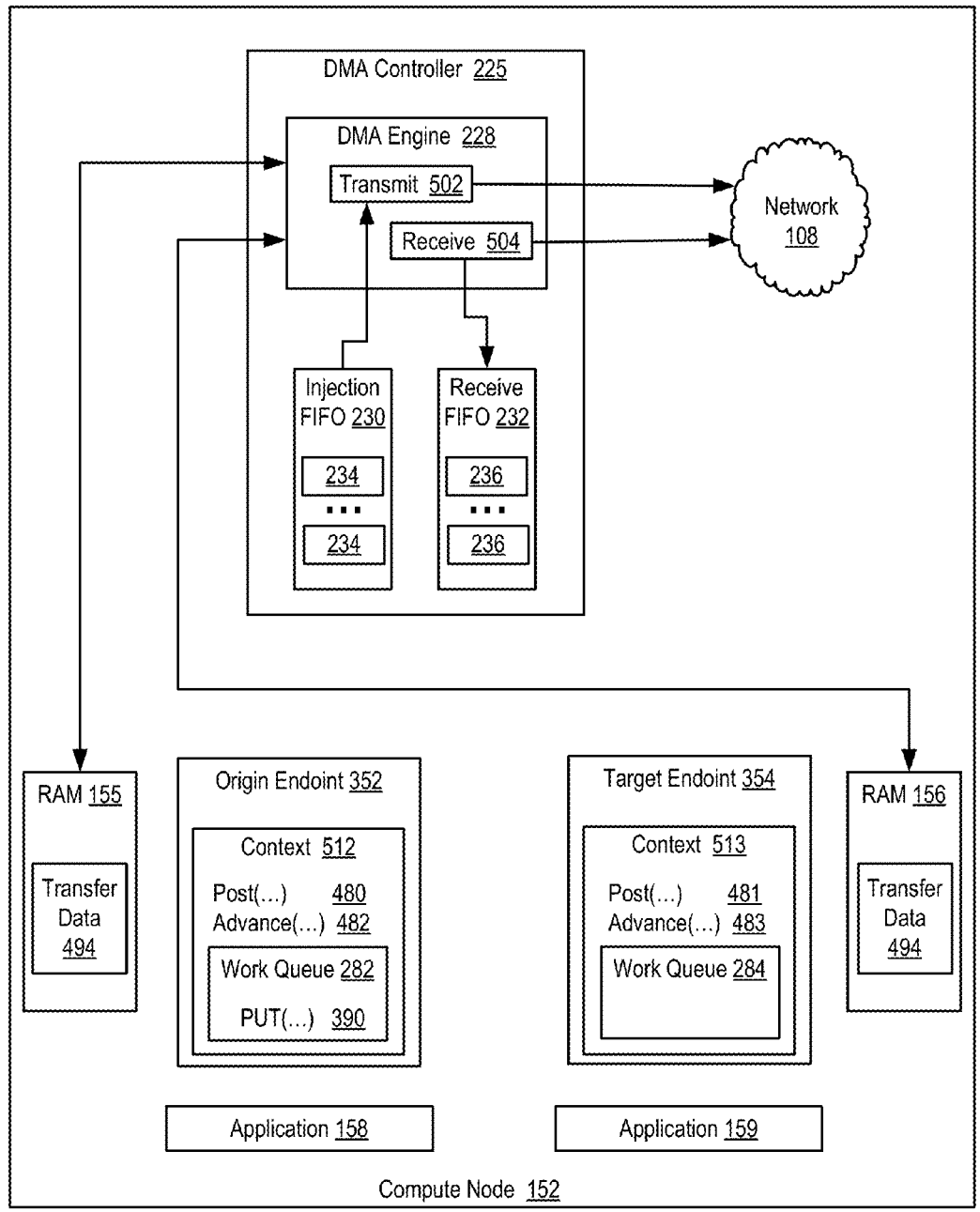
FIG. 8 sets forth a functional block diagram of an example DMA controller—in an architecture where the DMA controller is the only DMA controller on a compute node—and an origin endpoint and its target endpoint are both located on the same compute node.

The example of FIG. 7 includes two DMA controllers (225, 226). DMA transfers between endpoints on separate compute nodes use two DMA controllers, one on each compute node. Compute nodes can be implemented with multiple DMA controllers so that many or even all DMA transfers even among endpoints on a same compute node can be carried out using two DMA engines. In some embodiments at least, however, a compute node, like the example compute node (152) of FIG. 2, has only one DMA engine, so that that DMA engine can be use to conduct both sides of transfers between endpoints on that compute node. For further explanation of this fact, FIG. 8 sets forth a functional block diagram of an example DMA controller (225) operatively coupled to a network (108)—in an architecture where this DMA controller (225) is the only DMA controller on a compute node—and an origin endpoint (352) and its target endpoint (354) are both located on the same compute node (152). In the example of FIG. 8, a single DMA engine (228) operates with two threads of execution (502, 504) on behalf of endpoints (352, 354) on a same compute node to send and receive DMA transfer data through a segment (227) of shared memory. A transmit thread (502) injects transfer data into the network (108) as specified in data descriptors (234) in an injection FIFO buffer (230), and a receive thread (502) receives transfer data from the network (108) as specified in data descriptors (236) in a receive FIFO buffer (232).

The overall operation of an example PUT DMA transfer with the DMA controllers (225) and the network (108) in the example of FIG. 8 is: An originating application (158), that is actually one of multiple instances (158, 159) of a parallel application running on a compute node (152) in separate threads of execution, places a quantity of transfer data (494) at a location in its RAM (155). The application (158) then calls a post function (480) on a context (512) of an origin endpoint (352), posting a PUT instruction (390) into a work queue (282) of the context (512); the PUT instruction specifies a target endpoint (354) to which the transfer data is to be sent as well as source and destination memory locations. The application (158) then calls an advance function (482) on the context (512). The advance function (482) finds the new PUT instruction (390) in its work queue (282) and inserts a data descriptor (234) into the injection FIFO of the DMA controller (225); the data descriptor includes the source and destination memory locations and the specification of the target endpoint. The DMA engine (225) then transfers by its transmit and receive threads (502, 504) through the network (108) the data descriptor (234) as well as the transfer data (494). The DMA engine (228), upon receiving by its receive thread (504) the data descriptor and the transfer data, places the transfer data (494) into the RAM (156) of the target application and inserts into the DMA controller's receive FIFO (232) a data descriptor (236) that specifies the target endpoint and the location of the transfer data (494) in RAM (156). The target application (159) calls an advance function (483) on a context (513) of the target endpoint (354). The advance function (483) checks the communications resources assigned to its context for incoming messages, including checking the receive FIFO (232) of the DMA controller (225) for data descriptors that specify the target endpoint (354). The advance function (483) finds the data descriptor for the PUT transfer and advises the target application (159) that its transfer data has arrived. Again, a GET-type DMA transfer works in a similar manner, with some differences, including, of course, the fact that transfer data flows in the opposite direction. And typical SEND transfers also operate similarly, some with rendezvous protocols, some with eager protocols, with data transmitted in packets over the a network through non-DMA network adapters or through DMA controllers.

By use of an architecture like that illustrated and described with reference to FIG. 8, a parallel application or an application messaging module that is already programmed to use DMA transfers can gain the benefit of the speed of DMA data transfers among endpoints on the same compute node with no need to reprogram the applications or the application messaging modules to use the network in other modes. In this way, an application or an application messaging module, already programmed for DMA, can use the same DMA calls through a same API for DMA regardless whether subject endpoints are on the same compute node or on separate compute nodes.

Figure 9:
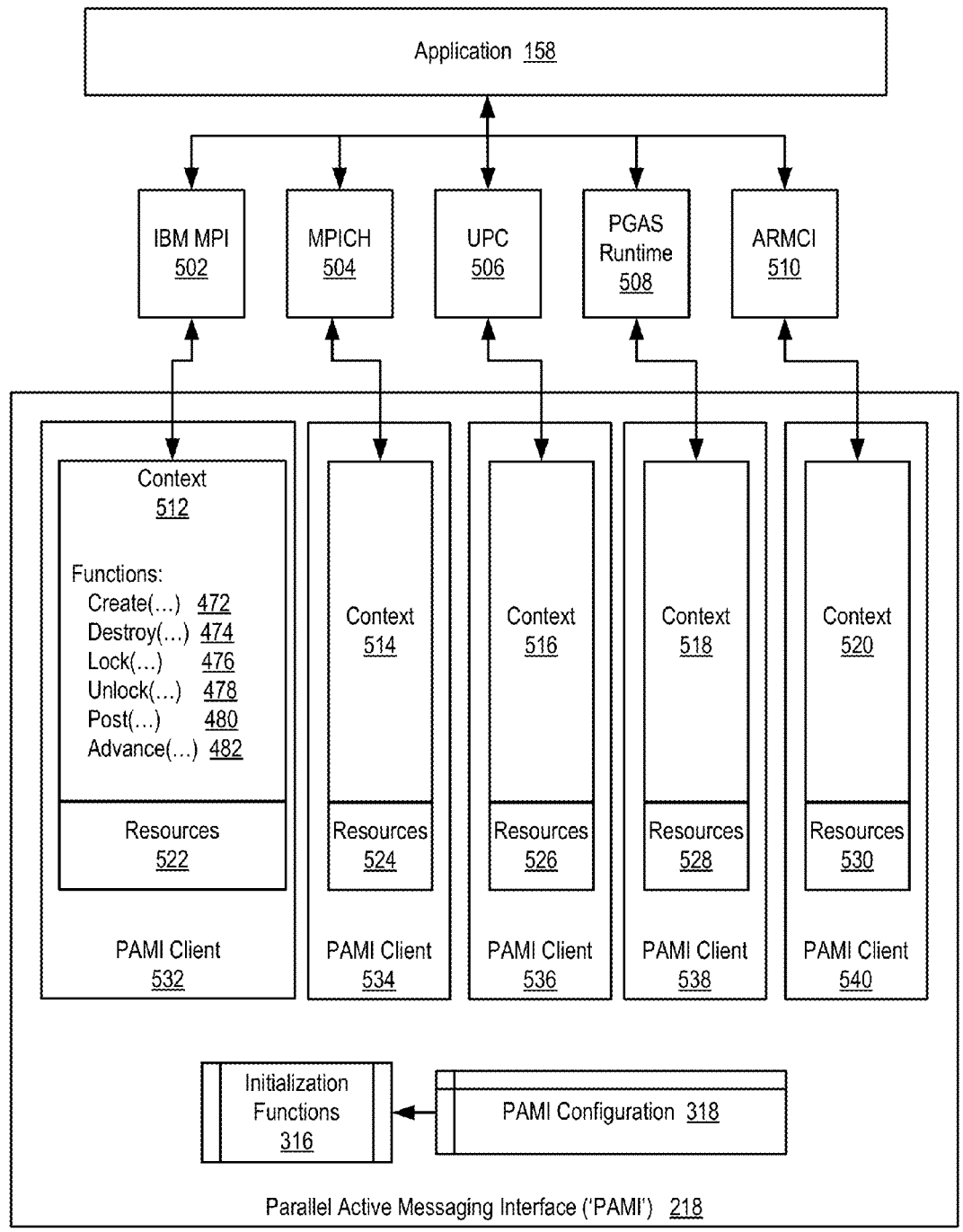
FIG. 9 sets forth a functional block diagram of an example PAMI for use in parallel computers that implement acquiring remote SVD information according to embodiments of the present invention.

FIG. 9 sets forth a functional block diagram of an example PAMI (218) useful in parallel computers that implement acquiring remote shared variable directory (SVD) information according to embodiments of the present invention in which the example PAMI operates, on behalf of an application (158), with multiple application messaging modules (502-510) simultaneously. The application (158) can have multiple messages in transit simultaneously through each of the application messaging modules (502-510). Each context (512-520) carries out, through post and advance functions, data communications for the application on data communications resources in the exclusive possession, in each client, of that context. Each context carries out data communications operations independently and in parallel with other contexts in the same or other clients. In the example FIG. 9, each client (532-540) includes a collection of data communications resources (522-530) dedicated to the exclusive use of an application-level data processing entity, one of the application messaging modules (502-510):

IBM MPI Library (502) operates through context (512) data communications resources (522) dedicated to the use of PAMI client (532), MPICH Library (504) operates through context (514) data communications resources (524) dedicated to the use of PAMI client (534), Unified Parallel C ('UPC') Library (506) operates through context (516) data communications resources (526) dedicated to the use of PAMI client (536), Partitioned Global Access Space ('PGAS') Runtime Library (508) operates through context (518) data communications resources (528) dedicated to the use of PAMI client (538), and Aggregate Remote Memory Copy Interface ('ARMCI') Library (510) operates through context (520) data communications resources (530) dedicated to the use of PAMI client (540).

Context functions, explained here with regard to references (472-482) on FIG. 9, include functions to create (472) and destroy (474) contexts, functions to lock (476) and unlock (478) access to a context, and functions to post (480) and advance (480) work in a context. For ease of explanation, the context functions (472-482) are illustrated in only one expanded context (512); readers will understand, however, that all PAMI contexts have similar context functions. The create (472) and destroy (474) functions are, in an object-oriented sense, constructors and destructors. In the example embodiments described in this specifications, post (480) and advance (482) functions on a context are critical sections, not thread safe. Applications using such non-reentrant functions must somehow ensure that critical sections are protected from re-entrant use.

Posts and advances (480, 482 on FIG. 9) are functions called on a context, either in a C-type function with a context ID as a parameter, or in object oriented practice where the calling entity possesses a reference to a context or a context object as such and the posts and advances are member methods of a context object.

Figure 10:
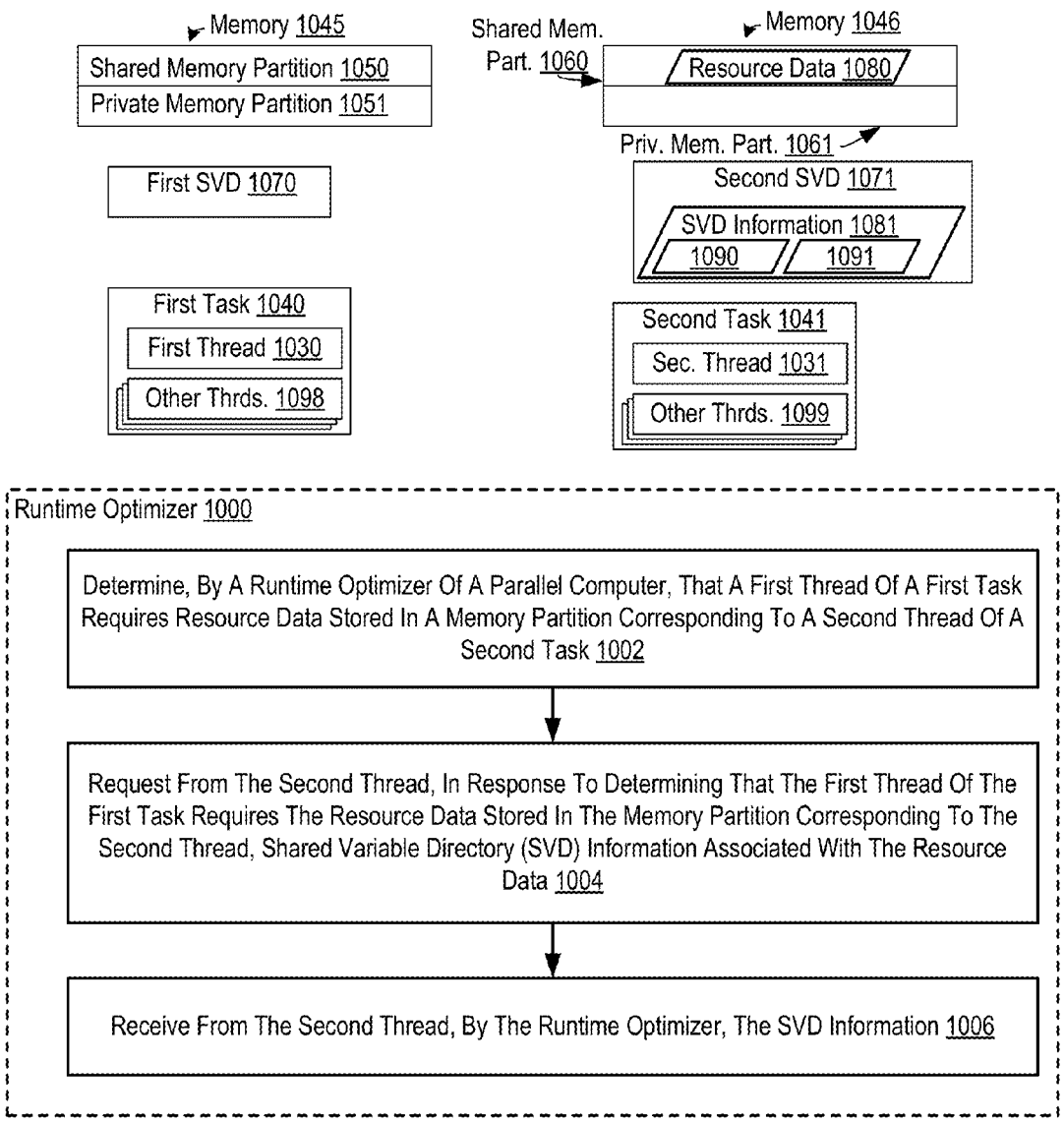
FIG. 10 sets forth a flow chart illustrating an example method of acquiring remote SVD information in a parallel computer according to embodiments of the present invention.

FIG. 10 sets forth a flow chart illustrating an example method of acquiring remote shared variable directory (SVD) information of a parallel computer according to embodiments of the present invention. An SVD may be a distributed symbol table that indexes shared objects by handles or keys. In the SVD, each handle or key has a corresponding local address within a memory partition of a thread. Threads may be organized into tasks. Each thread may have a partition of shared memory and private memory. In the example of FIG. 10, a first task (1040) includes a first thread (1030) and a plurality of other threads (1098) and a second task (1041) includes a second thread (1031) and a plurality of other threads (1099). Memory (1045) is divided into a shared memory partition (105) and a private memory partition (1051) for the threads of the first task (1040).

The method of FIG. 10 includes a runtime optimizer (1000) determining (1002) that a first thread (1030) of a first task (1040) requires shared resource data (1080) stored in a memory partition (1060) corresponding to a second thread (1031) of a second task (1041). Determining (1002) that a first thread (1030) of a first task (1040) requires shared resource data (1080) may be carried out by identifying a segment of code for execution on the first thread that utilizes the shared resource data of the second thread.

The method of FIG. 10 includes requesting (1004) from the second thread (1031), in response to determining that the first thread (1030) of the first task (1040) requires the shared resource data (1080), SVD information (1081) associated with the shared resource data (1080). Requesting (1004) from the second thread (1031) the SVD information (1081) associated with the shared resource data (1080) may be carried out by transmitting an active 'GET' message to the second thread. In response to receiving the GET message, the second thread performs a lookup in its SVD (1071) to retrieve the SVD information (1081). The second thread may use the SVD information (1081) to retrieve the address in the memory partition where the data is stored.

The method of FIG. 10 also includes the runtime optimizer (1000) receiving (1006) from the second thread (1031), the SVD information (1081). Receiving (1006) from the second thread (1031), the SVD information (1081) may be carried out by receiving an acknowledgement message in response to the GET message. The acknowledgement message may include SVD information, such as the address in the shared memory partition where the resource data is stored.

Figure 11:
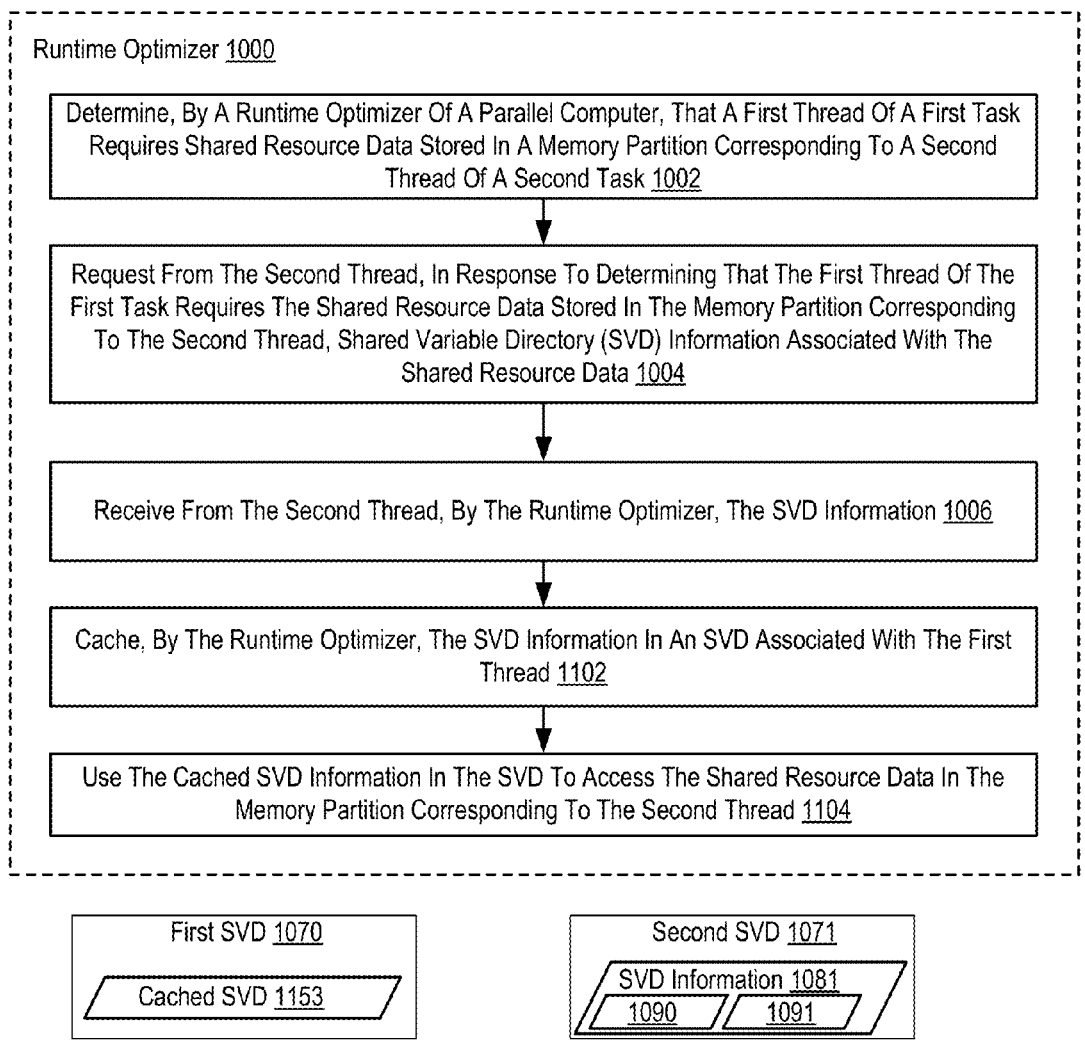
FIG. 11 sets forth a flow chart illustrating a further example method of acquiring remote SVD information in a parallel computer according to embodiments of the present invention.

FIG. 11 sets forth a flow chart illustrating a further example method of acquiring remote shared variable directory (SVD) information of a parallel computer according to embodiments of the present invention. The method of FIG. 11 is similar to the method of FIG. 10 in that the method of FIG. 11 also includes: determining (1002) that a first thread (1030) of a first task (1040) requires shared resource data (1080) stored in a memory partition (1060) corresponding to a second thread (1031) of a second task (1041); requesting (1004) from the second thread (1031), in response to determining that the first thread (1030) of the first task (1040) requires the shared resource data (1080), the SVD information (1081) associated with the shared resource data (1080); and receiving (1006) from the second thread (1031) the SVD information (1081).

The method of FIG. 11 also includes caching (1102) the SVD information (1081) in an SVD (1070) associated with the first thread (1030). Caching (1102) the SVD information (1081) in an SVD (1070) associated with the first thread (1030) may be carried out by identifying a handle within the SVD information; and storing the SVD information in an SVD at the entry corresponding to the key.

The method of FIG. 11 also includes using (1104) the cached SVD information (1153) in the SVD (1070) to access the shared resource data (1080) in the shared memory partition (1060) corresponding to the second thread (1031). Using (1104) the cached SVD information (1153) in the SVD (1070) to access the shared resource data (1080) in the shared memory partition (1060) corresponding to the second thread (1031) may be carried out by retrieving the address from the SVD; and using the address to access the shared memory partition of the second thread.

Figure 12:
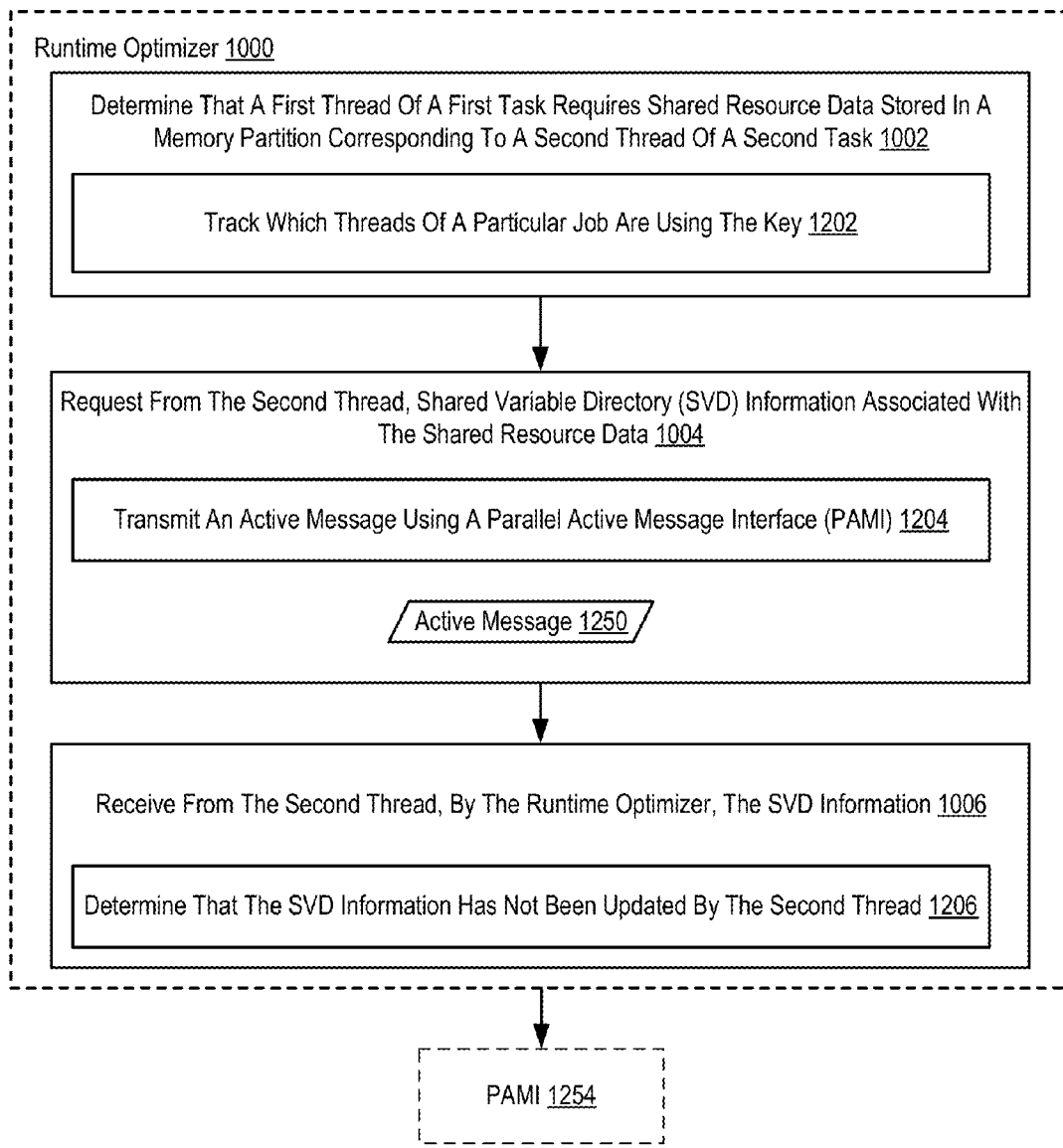
FIG. 12 sets forth a flow chart illustrating a further example method of acquiring remote SVD information in a parallel computer according to embodiments of the present invention.

FIG. 12 sets forth a flow chart illustrating a further example method of acquiring remote shared variable directory (SVD) information of a parallel computer according to embodiments of the present invention. The method of FIG. 12 is similar to the method of FIG. 10 in that the method of FIG. 12 also includes: determining (1002) that a first thread (1030) of a first task (1040) requires shared resource data (1080) stored in a memory partition (1060) corresponding to a second thread (1031) of a second task (1041); requesting (1004) from the second thread (1031), in response to determining that the first thread (1030) of the first task (1040) requires the shared resource data (1080), SVD information (1081) associated with the shared resource data (1080); and receiving (1006) from the second thread (1031) the SVD information (1081).

In the method of FIG. 12, however, determining (1002) that a first thread (1030) of a first task (1040) requires shared resource data (1080) stored in a shared memory partition (1060) includes tracking (1202) which threads of a particular job are using a key (1090). Tracking (1202) which threads of a particular job are using a key (1090) may be carried out by monitoring initiation and use of a key by threads of a particular job; and storing the initiation and use in a identifier table.

In the method of FIG. 12, however, requesting (1004) from the second thread (1031) the SVD information (1081) associated with the shared resource data (1080) includes transmitting (1204) an active message (1252) using a parallel active message interface (PAMI) (1254). Transmitting (1204) an active message (1252) using a parallel active message interface (PAMI) (1254) may be carried out by transmitting an active GET message.

In the method of FIG. 12, however, receiving (1006) from the second thread (1031) the SVD information (1081) includes determining (1206) that the SVD information has not been updated by the second thread. Determining (1206) that the SVD information has not been updated by the second thread may be carried out by monitoring usage of keys in an application program.

Example embodiments of the present invention are described largely in the context of a fully functional parallel computer that implements acquiring remote shared variable directory (SVD) information. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by those of skill in the art, aspects of the present invention may be embodied as method, apparatus or system, or computer program product. Accordingly, aspects of the present invention may take the form of an entirely hardware embodiment or an embodiment combining software and hardware aspects (firmware, resident software, micro-code, microcontroller-embedded code, and the like) that may all generally be referred to herein as a "circuit," "module," "system," or "apparatus." Furthermore, aspects of the present invention may take the form of a computer program product embodied in one or more computer readable media having computer readable program code embodied thereon.

Any combination of one or more computer readable media may be utilized. Such a computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described in this specification with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of computer apparatus, methods, and computer program products according to various embodiments of the present invention. In this regard, each block in a flowchart or block diagram may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A parallel computer for acquiring remote shared variable directory (SVD) information, the parallel computer comprising a plurality of threads of execution, the threads organized into tasks, the parallel computer further comprising memory partitioned to provide each thread with a private memory and a shared memory, the parallel computer comprising computer processors operatively coupled to the memory having disposed within it computer program instructions that, when executed by the computer processors, cause the parallel computer to function by:

determining, by a runtime optimizer of the parallel computer, that a first thread of a first task requires shared resource data stored in a memory partition of a remote SVD corresponding to a second thread of a second task;

in response to determining that the first thread of the first task requires the shared resource data stored in the memory partition of the remote SVD corresponding to the second thread, requesting from the second thread, by the runtime optimizer, SVD information associated with the shared resource data; and receiving from the second thread, by the runtime optimizer, the SVD information associated with the shared resource data, the SVD information including an address indicating where the shared resource data is stored in the memory partition of the remote SVD corresponding to the second thread.

2. The computer of claim 1 further comprising computer program instructions that, when executed by the computer processors, cause the parallel computer to function by:

caching, by the runtime optimizer, the SVD information in an SVD associated with the first thread; and using the cached SVD information in the SVD to access the shared resource data in the memory partition of the remote SVD corresponding to the second thread.

3. The computer of claim 1 wherein the SVD information includes a key identifying the shared resource data.

4. The computer of claim 3 wherein determining, by a runtime optimizer of the parallel computer, that a first thread of a first task requires shared resource data stored in a memory partition corresponding to a second thread of a second task includes tracking which threads of a particular job are using the key.

5. The computer of claim 1 wherein requesting from the second thread, by the runtime optimizer, SVD information associated with the shared resource data includes transmitting an active message using a parallel active message interface (PAMI).

6. The computer of claim 1 wherein using the cached SVD information in the SVD to access the resource data in the shared memory partition corresponding to the second thread includes determining that the SVD has not been updated by the second thread.

7. A computer program product for acquiring remote shared variable directory (SVD) information in a parallel computer, the parallel computer comprising a plurality of threads of execution, the threads organized into tasks, the parallel computer further comprising memory partitioned to provide each thread with a private memory and a shared memory, the computer program product disposed upon a computer readable storage medium, wherein the computer readable storage medium is not a signal, the computer program product comprising computer program instructions that, when installed and executed by a computer processor, cause the parallel computer to carry out the steps of:

determining, by a runtime optimizer of the parallel computer, that a first thread of a first task requires shared resource data stored in a memory partition of a remote SVD corresponding to a second thread of a second task;

in response to determining that the first thread of the first task requires the shared resource data stored in the memory partition of the remote SVD corresponding to the second thread, requesting from the second thread, by the runtime optimizer, SVD information associated with the shared resource data; and receiving from the second thread, by the runtime optimizer, the SVD information associated with the shared resource data, the SVD information including an address indicating where the shared resource data is stored in the memory partition of the remote SVD corresponding to the second thread.

8. The computer program product of claim 7 further comprising computer program instructions that, when installed and executed by a computer processor, cause the parallel computer to carry out the steps of caching, by the runtime optimizer, the SVD information in an SVD associated with the first thread; and using the cached SVD information in the SVD to access the shared resource data in the memory partition of the remote SVD corresponding to the second thread.

9. The computer program product of claim 7 wherein the SVD information includes a key identifying the shared resource data.

10. The computer program product of claim 9 wherein determining, by a runtime optimizer of the parallel computer, that a first thread of a first task requires shared resource data stored in a memory partition corresponding to a second thread of a second task includes tracking which threads of a particular job are using the key.

11. The computer program product of claim 7 wherein requesting from the second thread, by the runtime optimizer, SVD information associated with the shared resource data includes transmitting an active message using a parallel active message interface (PAMI).

12. The computer program product of claim 7 wherein using the cached SVD information in the SVD to access the resource data in the shared memory partition corresponding to the second thread includes determining that the SVD has not been updated by the second thread.

* * * * *